United States Patent [19]

Sato et al.

[11] 4,131,092
[45] Dec. 26, 1978

[54] FLAME GUIDE CHANNEL FOR INTERNAL COMBUSTION ENGINE

[75] Inventors: Yasuhito Sato, Kamifukuoka; Minoru Tanaka, Choufu; Akihisa Nakamura, Tokyo, all of Japan

[73] Assignee: Honda Giken Kogyo Kabushiki Kaisha, Tokyo, Japan

[21] Appl. No.: 757,688

[22] Filed: Jan. 7, 1977

[30] Foreign Application Priority Data

Jan. 17, 1976 [JP] Japan .................... 51-3773

[51] Int. Cl.² .............................................. F02F 1/42
[52] U.S. Cl. ............................ 123/32 ST; 123/32 SP; 123/191 S; 123/193 H
[58] Field of Search ............. 123/30 D, 32 C, 32 D, 123/32 K, 32 L, 32 ST, 32 SP, 191 R, 191 M, 191 S, 191 SP, 193 R, 193 H, 193 CH

[56] References Cited

U.S. PATENT DOCUMENTS

| 1,483,619 | 2/1924 | Smith | 123/32 SP |
| 1,568,638 | 1/1926 | Summers | 123/191 SP |
| 2,314,175 | 3/1943 | Summers | 123/33 D |
| 2,884,913 | 5/1959 | Heintz | 123/191 SP |
| 3,092,088 | 6/1963 | Goossak et al. | 123/191 SP |
| 3,230,939 | 1/1966 | Goossak | 123/32 SP |
| 3,543,736 | 12/1970 | Suzuki | 123/32 ST |
| 3,930,471 | 1/1976 | Leonard | 123/32 SP |
| 3,967,595 | 7/1976 | Yagi | 123/32 SP |
| 3,976,038 | 8/1976 | Stahl | 123/32 ST |

FOREIGN PATENT DOCUMENTS

| 743100 | 10/1943 | Fed. Rep. of Germany | 123/32 D |
| 505895 | 5/1939 | United Kingdom | 123/191 L |

Primary Examiner—Charles J. Myhre
Assistant Examiner—Craig R. Feinberg
Attorney, Agent, or Firm—Lyon & Lyon

[57] ABSTRACT

An internal combustion piston engine has a main combustion chamber supplied with a lean mixture and an auxiliary combustion chamber supplied with a rich mixture. A spark plug ignites a mixture in the auxiliary chamber to project a flame through a torch passage into the main chamber. Walls in the underside of the stationary head of the engine form a flame guide channel diverging from the torch passage toward intake and exhaust valves which are located equidistantly from the torch passage. The torch passage may comprise an elongated slot or a pair of spaced openings.

4 Claims, 8 Drawing Figures

FLAME GUIDE CHANNEL FOR INTERNAL COMBUSTION ENGINE

This invention relates to internal combustion piston engines having one or more cylinders each provided with a main combustion chamber and an auxiliary combustion chamber connected by a torch passage. A lean mixture is supplied to the main combustion chamber and a rich mixture is supplied to the smaller auxiliary combustion chamber. After the compression stroke of the piston, a spark plug ignites a mixture in the auxiliary combustion chamber to project a flame through the torch passage across the main combustion chamber to ignite the lean mixture.

It is known that a lean mixture helps to reduce the generation of $NO_x$ during combustion in engines of this type. However, when the lean mixture is made extremely lean and close to the combustion limit, the flame projected from the auxiliary chamber ignites the mixture in the main chamber principally in the neighborhood of the opening of the torch passage. Therefore, this system has the disadvantage that the rate of flame propagation in the mixture in the main chamber slows to such an extent that combustion of the lean mixture does not reach completion during the combustion stroke. The combustion slows or ceases during the following exhaust stroke, and accordingly the average combustion gas temperature in the main combustion chamber lowers, resulting in an increase of HC in the exhaust and also a worsening of the driveability of a vehicle powered by such an engine.

To overcome such a disadvantage, it is necessary for the combustion gas temperature in the main combustion chamber to be raised to a high level, and in accordance with this invention it has been found to be very effective to have the flame injected through the torch passage to the main chamber to spread widely therein without increasing the speed of the flame. In this way the mixture in the main combustion chamber has flame acting at various points so that combustion proceeds with sufficient rapidity, raising the combustion gas temperature.

Other and more detailed objects and advantages will appear hereinafter.

Figure 1:
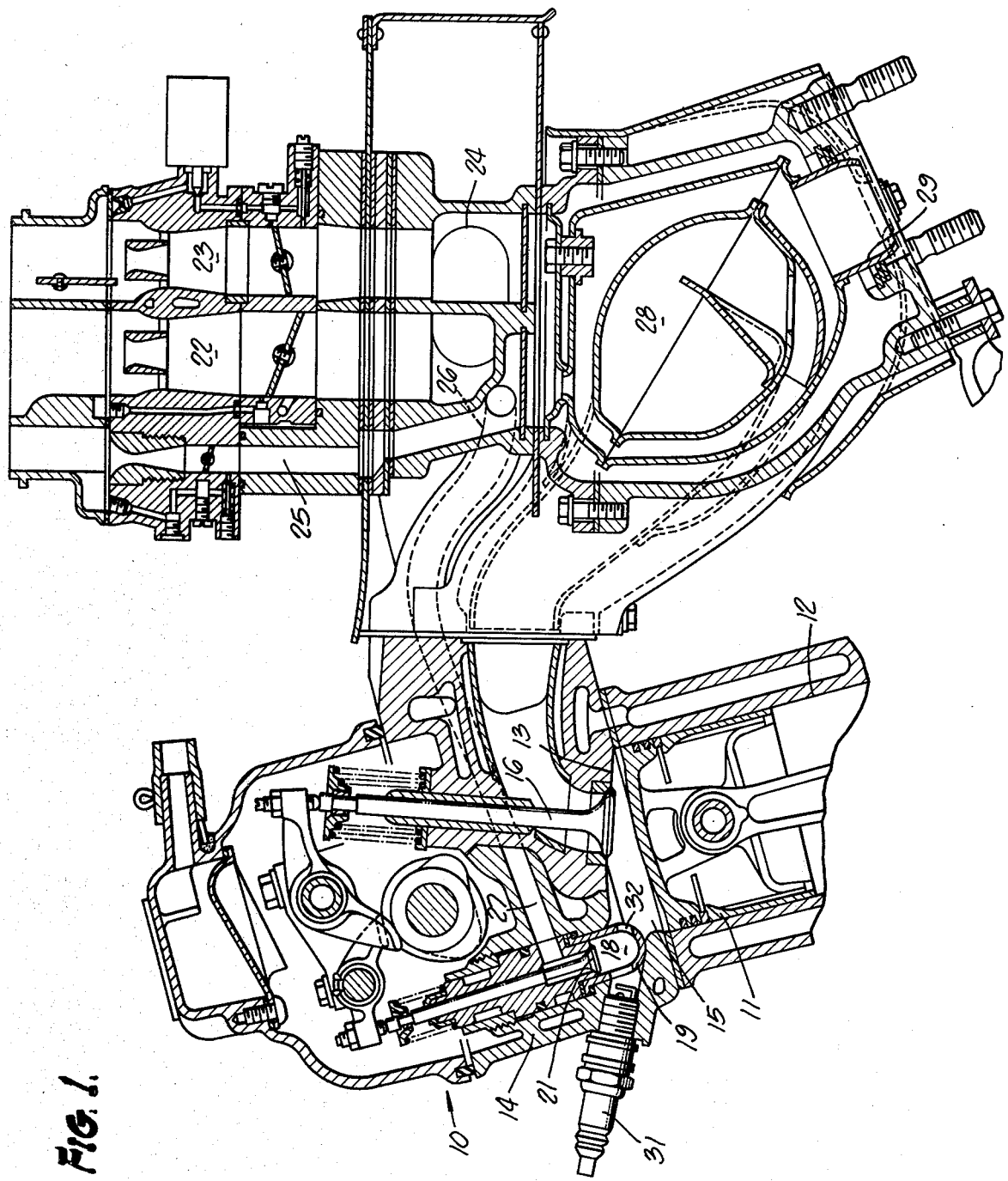
FIG. 1 is a sectional elevation showing a preferred embodiment of this invention.

Referring to the drawings, the internal combustion engine generally designated 10 has one or more pistons 11 each operating in a cylinder 12 and each cooperating with walls 13 formed in the engine head 14 to form a main combustion chamber 15. An intake valve 17 and an exhaust valve 16 open into each main combustion chamber 15. An auxiliary combustion chamber 18 is formed within a liner element 19 and is provided with an auxiliary intake valve 21.

A lean mixture is delivered to the main combustion chamber 15 from carburetor throats 22 and 23 through intake passages 24 and intake valve 17. A rich mixture is supplied through carburetor throat 25 and passages 26 and 27. Exhaust gases are discharged through exhaust valve 16 into the exhaust reaction chamber 28 and through outlet 29 to a tailpipe, not shown.

Figure 2:
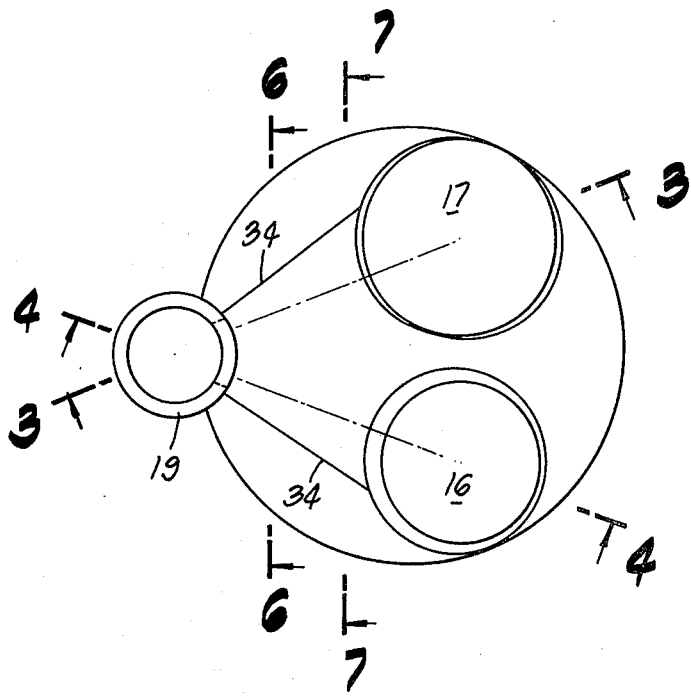
FIG. 2 is a bottom plan view in diagrammatic form showing the underside of the top wall of the main combustion chamber.
Figure 3:
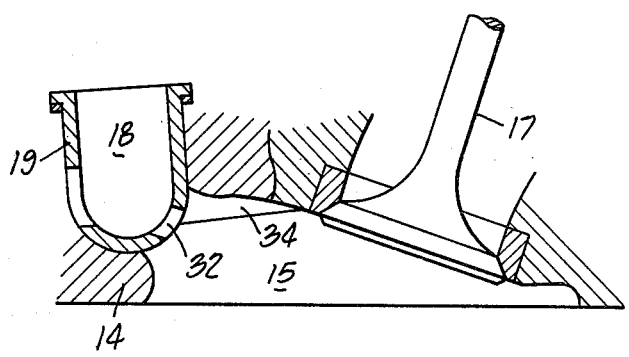
FIG. 3 is a fragmentary sectional view taken substantially on the lines 3—3 as shown in FIG. 2.
Figure 4:
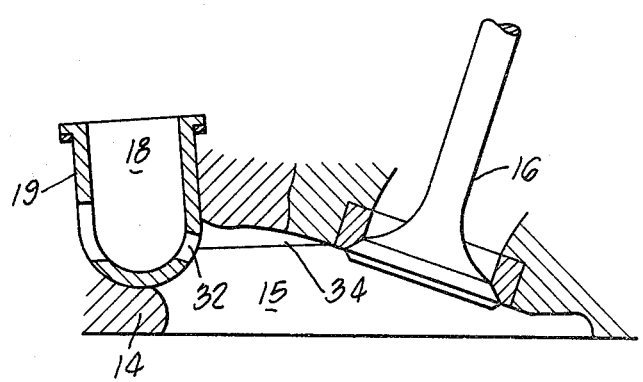
FIG. 4 is a view similar to FIG. 3 taken substantially on the lines 4—4 as shown in FIG. 2.
Figure 5:
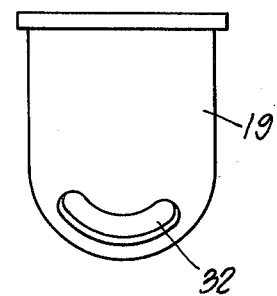
FIG. 5 is a side elevation of the liner for the auxiliary combustion chamber and showing a preferred form of torch opening.
Figure 6:
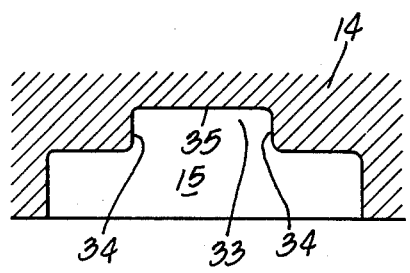
FIG. 6 is a ssectional elevation taken substantially on the lines 6—6 as shown in FIG. 2.
Figure 7:
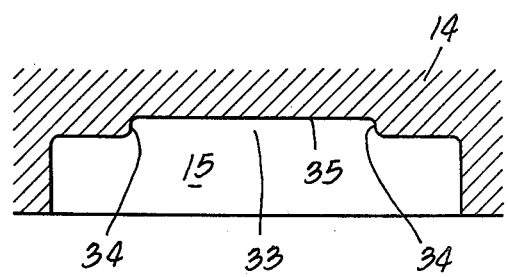
FIG. 7 is a sectional elevation taken substantially on the lines 7—7 as shown in FIG. 2.

A spark plug 31 is used to ignite a mixture in the auxiliary chamber 18 to project a flame laterally through the torch passage 32 and across the main combustion chamber 15. In accordance with this invention, the torch passage 32 takes the form of an elongated slot, as shown in FIG. 5, the center of the curved ends of the slot being directed toward the centers of the valves 16 and 17, as best shown in FIG. 2. The slot curves in two planes, the one plane being determined by the curvature of the wall of the auxiliary chamber and the second plane being defined by the face of the wall containing the slot. The valves 16 and 17 are each placed in a remote position with respect to the torch passage or slot 32 and substantially equidistant therefrom. The walls 13 in the head 14 which cooperate with the piston 11 to define the main combustion chamber 15 are provided with a flame guide channel 33 whose boundaries 34 diverge from said torch passage 32 toward said valves 16 and 17. The depth of the flame guide channel 33 decreases as its width increases. Moreover, the flame guide channel may have a stepped cross-section as shown in FIGS. 6 and 7, in which the center portion 35 is deeper than the other portions.

The construction just described including the flame guide channel 33 enables the engine to run on very lean mixtures, and with good performance and with low HC emissions. This is accomplished by guiding the torch flame from the auxiliary combustion chamber 18 so that a definite predetermined part of the main combustion chamber 15 is first subjected to the action of the injected flame. In spite of the relatively slow rate of flame propagation in lean mixtures, the flame guide channel 33 brings about more rapid and complete combustion with higher temperatures. It has been found that extremely lean mixtures, so lean as to be close to the combustion limit, can be satisfactorily employed.

Figure 8:
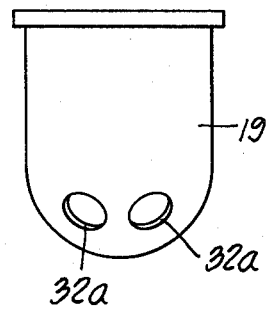
FIG. 8 is a view similar to FIG. 5 showing a modification.

In the modified form of the invention shown in FIG. 8, two round torch openings 32a are positioned to direct their respective flames toward the centers of the valves 16 and 17. The operation is similar to that previously described.

Having fully described our invention, it is to be understood that we are not to be limited to the details herein set forth, but that our invention is of the full scope of theappended claims.

We claim:

1. In an internal combustion piston engine, the combination of: a wall in the underside of a stationary head of the engine cooperating with a movable piston to form a main combustion chamber, means forming an auxiliary combustion chamber at one side of said main combustion chamber, a torch passage connecting said chambers, an intake valve and an exhaust valve opening into said main ocmbustion chamber and positioned remotely and substantially equidistantly from said torch passage, a flame guide channel formed in the walls in the underside of the head laterally diverging from said torch passage toward said valves, the depth of the flame guide channel decreasing as its width increases, means for supplying a lean mixture to the main combustion chamber through said intake valve, means including an auxiliary intake valve for supplying a rich mixture to said auxiliary chamber, means for igniting a mixture in said auxiliary chamber to cause a flame to project through said torch passage and through said flame guide channel across said main combustion chamber, said flame guide channel promoting a flame spread across the top of the main combustion chamber.

2. The combination set forth in claim 1 in which said torch passage means comprises an elongated slot curved in two planes in a wall of the auxiliary chamber.

3. The combination set forth in claim 1 in which there are two spaced openings, one near each side of said flame guide channel.

4. The combination set forth in claim 1 wherein the walls of the flame guide channel include a top wall and two diverging boundary walls, one boundary wall extending from the torch passage in a direction substantially tangential to the outer perimeter of the one valve and the second boundary wall extending from the torch passage in a direction substantially tangential to the outer perimeter of the second valve.

* * * * *